United States Patent Office 3,370,606
Patented Feb. 27, 1968

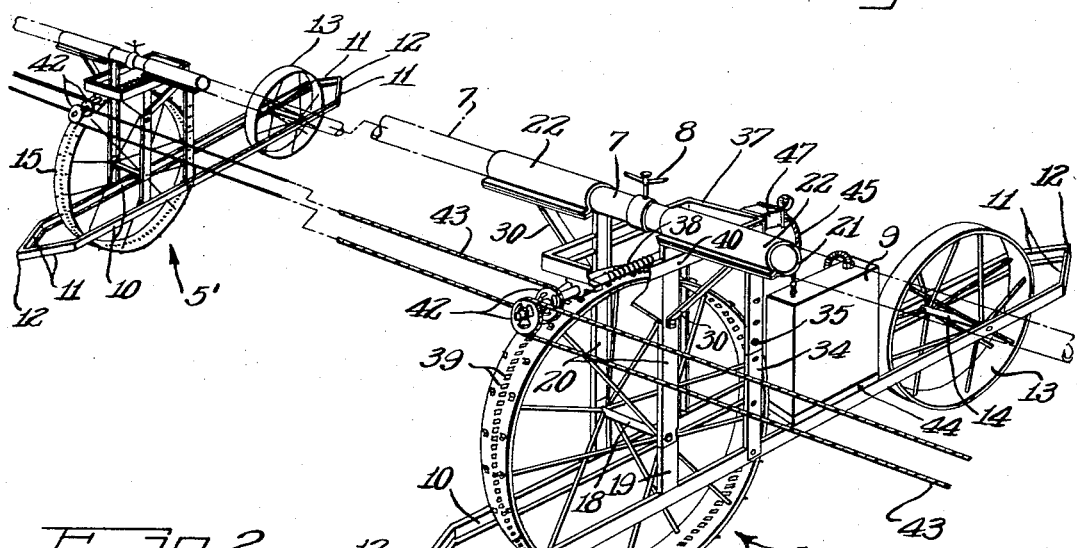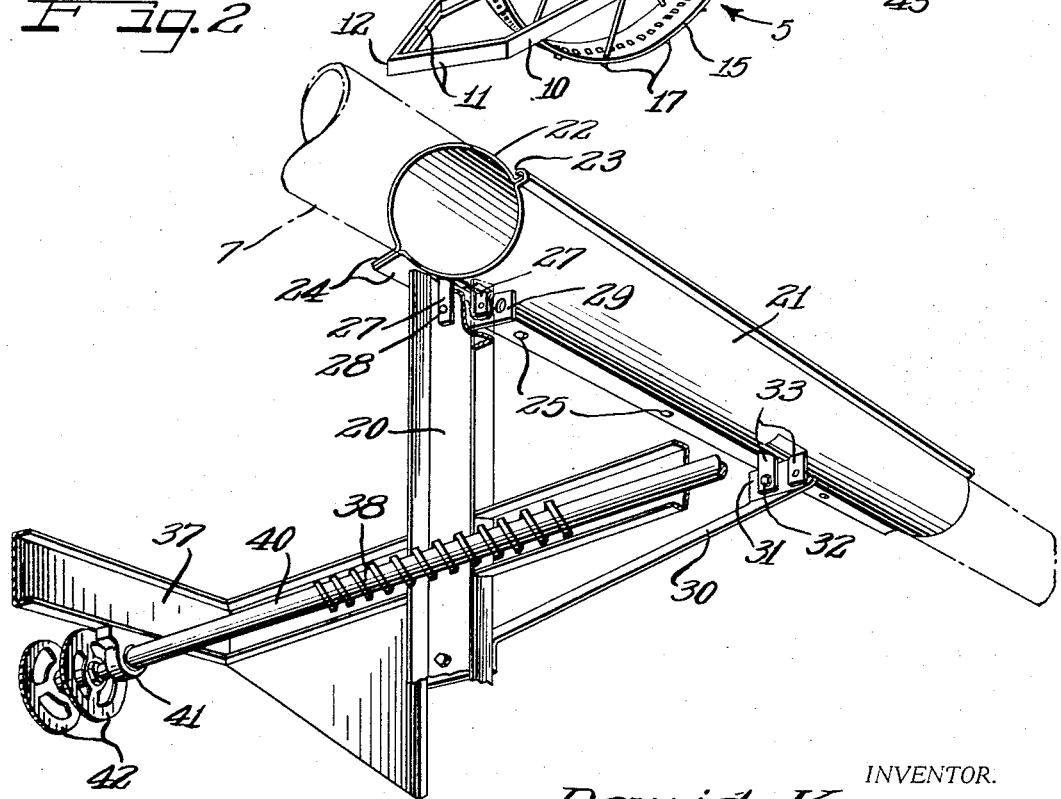

3,370,606
MOBILE IRRIGATION DEVICES
David Kane, 5036 Roosevelt Road,
San Antonio, Tex. 78214
Filed July 23, 1964, Ser. No. 384,740
9 Claims. (Cl. 137—344)

ABSTRACT OF THE DISCLOSURE

Reversibly mobile elongated sprinkler conduit-supporting units are located at spaced parallel intervals along an irrigation conduit and each has an elongated frame tapering to crop spreader points at the opposite ends, with running wheels inside the frame adjacent to the crop spreaders, one of the wheels being powered by an overlying worm meshing with complementary worm slots in the tire band. A front-to-rear worm shaft has on one end a pair of coaxial sprockets over which are trained driving chains connecting adjacent companion units in coordinated slave relation. Conduit clamps are replaceably mounted on frame head structure of the unit.

---

This invention relates to improvements in irrigation devices and more particularly concerns a new and improved arrangement to facilitate movement of sprinkler conduits or pipes in field irrigation.

In large fields of crops requiring large amounts of water, especially in areas of insufficient rainfall, irrigation may be effected on a large scale by means of sprinkler conduits leading from a supply duct or header pipe, or the like, with sprinkler heads located at suitable intervals along the conduits, such as at 20 or 30 foot intervals. Desirably such sprinkler conduits are mounted on wheeled mobile units.

An important object of the present invention is to provide improvements in the mobile units for a sprinkler conduit irrigation system.

Another object of the invention is to provide new and improved driving means for the mobile units of a wheeled sprinkler conduit irrigation system.

A further object of the invention is to provide a new and improved carriage construction for mobile units of a sprinkler conduit irrigation system.

A still further object of the invention is to provide a new and improved interchangeable saddle clamp construction enabling adaptation for different sizes of sprinkler conduit on a mobile irrigation unit.

Other objects, features and advantages of the present invention will be readily apparent from the following detailed description of a preferred embodiment thereof, taken in conjunction with the accompanying drawing, in which:

FIGURE 1 is a fragmentary perspective view of a mobile irrigation sprinkler conduit system embodying features of the invention; and FIGURE 2 is a fragmentary perspective view showing various details of the worm drive and the conduit saddle clamp construction.

As depicted in FIGURE 1, a mobile sprinkler conduit irrigation system pursuant to the principles of the present invention comprises a powered or automotive mobile wheeled unit 5 and coupled in parallel relation therewith additional companion or slave units 5' coupled drivingly with the automotive or driver unit 5. There may be as many of the units 5' as desired and can practically be driven from the common source of power supported by the unit 5. The purpose of the wheeled units 5 and 5' is to support a suitable irrigation water duct or conduit 7 suitably connected with a source of water under a desirable head of pressure and comprising sections which may in practice be a rigid or semirigid lightweight aluminum or other suitable material pipe sections of desired length such as twenty to thirty feet or longer. At desirable intervals, such as at each of the units 5 and 5', the conduit is provided with respective sprinkler heads 8.

Except for a power source comprising a suitable power unit 9 which may comprise a battery operated electrical motor, an internal combustion engine, or the like, and associated apparatus, each of the units 5 and 5' is desirably of a standardized identical construction. Accordingly, each of the units has a frame structure comprising a bottom frame having a pair of spaced parallel coextensive longitudinal frame bars 10 connected rigidly together by convergently related joining terminals 11 united in a point or tip 12 and thereby defining a crop spreader wedge, at each end of the bottom frame.

Within the bottom frame adjacent to one of the spreader wedges is rotatably mounted an idler running wheel 13 on an axle 14.

Adajacent to the opposite spreader tip or wedge and within the bottom frame is rotatably mounted a traction wheel 15 which is desirably of substantially larger diameter than the idler wheel 13, and provided with suitable traction lugs 17 on its tire perimeter. An axle 18 for the traction wheel 15 is supported or journalled on coextensive transversely aligned upwardly projecting rigid posts 19 on the frame bars 10.

For supporting the sprinkler conduit 7, upward extension bars 20 from the posts 19 extend to a suitable height and carry respective saddle clamps each of which includes a saddle portion 21 and a complementary clamp portion 22. Between them, the clamp portions 21 and 22 provide a tubular gripping structure within which a predetermined gauge or diameter of conduit or pipe is firmly engageable. Suitable hinge means 23 along adjoining edges of the clamp sections enable opening and adjustable closing clamping cooperation of the clamp sections. Along their opposite edges, opposed securing flanges 24 on the clamp sections are adapted to be secured together as by means of bolts 25.

Attachment of the saddle portions or sections 21 of the clamps to the respective supporting frame uprights 20 is desirably effected in a manner enabling ready interchangeability or replacement of the clamps to accommodate the associated mobile unit for supporting sprinkler conduits of different sizes. To this end, the saddle section 21 has extending downwardly therefrom a pair of attachment ear lugs 27 arranged to be secured removably as by means of bolts 28 to the associated frame upright 20. As best seen in FIGURE 2, the attachment ear lugs 27 are located adjacent to one end of the saddle section 21 and may be conveniently formed as integral struck down lanced ears which are relatively offset both longitudinally and laterally on the shell-like saddle section for stabilized support. In order to accommodate variable lateral spacings of the attachment flange ear lugs 27 for variable sizes of clamps, a perforated lateral extension bar 29 may be mounted on the clamp supporting head portion of the upright frame member 20. Each of the clamps is mounted to project coaxially in the opposite direction from the end thereof attached to the respective upright frame member 20. Support for the projecting end portions of the clamp saddle sections 21 is provided by a diagonal strut 30 in each instance extending upwardly and outwardly from the companion frame upright 20 and having a head flange 31 to which are secured as by means of bolts 32 a pair of downwardly projecting ear lug flanges 33 on the saddle section 21, similar to the attachment lugs 27.

Since it is desirable for crops of varying types, or at various times during the growing season to vary the height at which the conduit 7 is supported, provisions are made for adjustment of the height at which the conduit supporting clamps are disposed. For this purpose, the clamp supporting uprights 20 are pivotally connected to the posts 19 as by means common to the traction wheel axle 18. To maintain the selected elevational adjustment, a vertically adjustable frame bar 34 is pivotally adjustably attached to each of the longitudinal frame bars 10 and extends upwardly therefrom and comprises a pair of telescopically adjustable sections connected together by a bolt 35 in each instance. At its upper end the vertical adjustment frame bar upright is attached to a generally horizontal frame 37 rigidly secured to the saddle-supporting uprights 20.

For driving the tractor wheel 15 of each of the units 5 and 5', a positive, powerful worm drive is provided. To this end, a worm 38 drivingly meshing with worm or spiral gear indentations or apertures 39 in the perimeter of the traction wheel tire is operatively supported by a shaft 40 journalled in bearings 41 mounted on the frame 37 which is conveniently of a front-to-rear elongated rectangular construction. For coupling all of the units 5 and 5' in a common drive relationship, a pair of sprocket wheels 42 is mounted fixedly on a forward extension of the worm shaft 40 in each instance. Sprocket chains 43 are trained over the sprocket wheels 42 and over respective sprocket wheels of the companion mobile units at each side of each of the units. Thereby, all of the units are driven in unison.

Power for driving of the assembly of mobile units is derived from the power source 9 mounted on a platform 44 transportably carried by the bottom frame of the unit 5. In a desirable form, the power unit 9 is of the kind that provides hydraulic pressure which is supplied through suitable conduit means 45 to a hydraulic motor 47 drivingly coupled to the worm shaft 40 of the mobile unit 5. Through this arrangement, driving of the worm 38 is adapted to be effected in either rotary direction for driving the mobile unit 5, and thereby all of the coupled units 5' in either a forward or rearward direction.

It will be understood that modifications and variations may be effected without departing from the scope of the novel concepts of the present invention.

I claim as my invention:

1. A mobile irrigation unit comprising a frame having an upper irrigation conduit supporting structure including a front-to-rear frame portion and adapted for use with a plurality of spaced parallel similar companion units along the conduit,
    a worm having a front-to-rear shaft mounted on said front-to-rear frame portion under the irrigation conduit supporting means,
    a traction wheel mounted rotatably on the frame under the worm and having worm gear means on its perimeter meshing with the worm,
    a forward extension on the worm shaft,
    and sprocket gear means on said forward extension for reception of sprocket chain means spanning between and coupling the unit drivingly in cooridnated slave relation with the worm shaft sprocket gear means of the companion units.

2. A mobile irrigation conduit supporting construction including an elongated base frame comprising spaced parallel coextensive frame bars,
    generally wedge-shaped crop spreader means joining the respective opposite ends of the base frame bars,
    an idler running wheel rotatably mounted between the base frame bars adjacent to one of said crop spreader means,
    upstanding frame means on said base frame bars adjacent to the opposite crop spreader means,
    and a traction wheel of substantially larger diameter than said idler wheel between said frame bars and rotatably mounted on said upstanding frame means adjacent to said opposite crop spreader means.

3. A mobile irrigation conduit supporting construction including an elongated base frame comprising spaced parallel coextensive frame bars,
    generally wedge-shaped crop spreader means joining the respective opposite ends of the base frame bars,
    an idler running wheel rotatably mounted between the base frame bars adjacent to one of said crop spreader means,
    upstanding frame means on said base frame bars adjacent to the opposite crop spreader means,
    a traction wheel of substantially larger diameter than said idler wheel between said frame bars and rotatably mounted on said upstanding frame means adjacent to said opposite crop spreader means,
    upstanding extension means on said frame means above said traction wheel,
    and irrigation conduit clamp means supported by said extension means above said traction wheel.

4. In a mobile irrigation unit,
    frame structure,
    running wheels carried by the frame structure,
    an upright frame member,
    a supporting strut extending upwardly and outwardly from the frame member,
    a tubular elongated conduit clamp including a saddle section overlying and supported by said frame member and said strut,
    downwardly extending attachment lugs adjacent to the respective opposite ends of the saddle section,
    and means releasably securing the lugs to said upright frame member and to said strut.

5. A unit as defined in claim 4, wherein said lugs are struck down lanced ear flanges on the saddle section.

6. A unit as defined in claim 5, in which a plurality of said lanced ear flanges are provided adjacent to one of said ends and such plurality of ear flanges are both longitudinally and laterally offset relative to one another.

7. A mobile irrigation conduit unit including means for supporting a sprinkler conduit and comprising a supporting frame structure including:
    an elongated base frame comprising spaced apart longitudinal bars;
    front and rear supporting wheels rotatably mounted between said bars; and
    at least one crop spreader formation comprising respective forward extensions on and angularly related to the bars and convergently joining in generally wedge-shaped fashion at a tip which extends substantially beyond the front supporting wheel and is spaced substantially above a ground surface over which the wheels travel so as to spread apart growing crop plants for passage of the wheels between the plants.

8. A mobile irrigation unit as defined in claim 7 in which the base frame bars have substantially identical convergently joined end extensions at opposite longitudinal ends of the frame for spreading growing crop plants, and the unit is reversible to travel in either longitudinal direction with respect to said frame.

9. In combination in an irrigation system comprising a conduit having at spaced intervals therealong sprinkler heads and wheeled mobile units supporting the conduit:
    each of the wheeled units having a traction wheel including a tire having worm gear means on its perimeter;
    supporting framework adjacent to the traction wheel;
    a worm shaft rotatably supported by said framework and extending on an axis normal to the axis of the conduit;
    a worm corotative with said shaft and meshing with said worm gear means;
    a plurality of sprocket gears corotative with said shaft;
    and sprocket chains trained over and spanning between the sprocket gears of the adjacent mobile units and thereby coupling the units drivingly in coordinated slave relation.

References Cited

UNITED STATES PATENTS

| | | | |
|---|---|---|---|
| 2,396,086 | 3/1946 | Conaway | 248—65 X |
| 2,666,335 | 1/1954 | Clayborne | 74—425 |
| 2,822,216 | 2/1958 | Finley et al. | 47—1.7 |
| 2,844,038 | 7/1958 | Danta | 74—425 X |
| 2,800,364 | 7/1957 | Dick et al. | 239—212 X |
| 2,892,466 | 6/1959 | Stillwell et al. | 137—344 |
| 3,009,645 | 11/1961 | Nugent | 239—213 X |
| 3,166,089 | 1/1965 | Wagner | 137—344 |
| 3,245,595 | 4/1966 | Purtell | 137—344 X |
| 3,246,848 | 4/1966 | Bowers | 239—212 |
| 3,255,968 | 6/1966 | Stafford | 239—212 |

FOREIGN PATENTS 13,145    3/1956    Germany.

M. CARY NELSON, *Primary Examiner.*

S. SCOTT, *Examiner.*